United States Patent [19]

Kassai

[11] 4,428,598
[45] Jan. 31, 1984

[54] BABY CARRIAGE

[75] Inventor: Kenzou Kassai, Osaka, Japan

[73] Assignee: Kassai Kabushikikaisha, Osaka, Japan

[21] Appl. No.: 398,667

[22] Filed: Jul. 15, 1982

[30] Foreign Application Priority Data

Jul. 27, 1981 [JP] Japan .............................. 56-118727
Feb. 9, 1982 [JP] Japan .............................. 57-20051

[51] Int. Cl.³ .............................................. B62B 7/06
[52] U.S. Cl. ...................................... 280/644; 280/42; 280/650; 297/45
[58] Field of Search ............... 280/642, 644, 647, 649, 280/650, 42, 643, 657, 658; 297/45, 61, DIG. 4

[56] References Cited

U.S. PATENT DOCUMENTS

| | | | |
|---|---|---|---|
| 3,989,295 | 11/1976 | Sparkes | 297/45 X |
| 4,111,454 | 9/1978 | Kassai | 280/649 |
| 4,317,581 | 3/1982 | Kassai | 280/650 X |
| 4,345,777 | 8/1982 | Perego | 280/658 X |
| 4,362,315 | 7/1982 | Kassai | 280/644 X |
| 4,386,790 | 6/1983 | Kassai | 280/650 |

Primary Examiner—Joseph F. Peters, Jr.
Assistant Examiner—Michael Mar
Attorney, Agent, or Firm—W. G. Fasse; D. H. Kane, Jr.

[57] ABSTRACT

A foldable baby carriage comprises a pair of front legs (10), a pair of rear legs (14) pivotally connected at their upper ends (15) to the front legs (10), a pair of support angle bars (20) pivotally connected at their one end (21) to the middle regions of the rear legs (14), a pair of pusher rods (2) pivotally connected at their lower ends to the other ends (22) of the support angle bars (20), slidable and pivotal connecting members (5) slidably and pivotally connecting the upper ends of the front legs (10) to the pusher rods (2), a pair of transverse connecting rods (24) operatively connecting the front legs (10) and support angle bars (20) together, a front leg connecting rod (11) extending between the front legs (10), a rear leg connecting rod (18) extending between the rear legs (14), and a pusher rod connecting rod (4) extending between the pusher rods (2). In the folding operation, while the slidable and pivotal connecting members (5) are sliding on the pusher rods (2), the pivotally connected portions turn. The turning movement of the support angle bars (20) on the rear legs (14) acts to sufficiently increase the height of the pusher rods (2) of the baby carriage in the opened state and sufficiently decrease the overall height of the baby carriage in the closed state.

10 Claims, 20 Drawing Figures

BABY CARRIAGE

BACKGROUND OF THE INVENTION

1. Field of the Invention

This invention relates to a baby carriage, and more particularly to improvements in a folding mechanism used in baby carriages of chair type construction.

2. Description of the Prior Art

Heretofore, baby carriages having various types of basic constructions have been proposed and put into practical use. These baby carriages include one having a chair type basic construction. Further, a foldable version of such baby carriage of chair type basic construction has also been proposed.

However, such foldable baby carriages of chair type basic construction still have some points which remain to be improved. More particularly, such a conventional type, when folded, is still bulky. Further, such a conventional type, when folded, has its four wheels, front and rear, not on a level with each other, so that it is impossible for the baby carriage to stand by itself when folded. Accordingly, it is desired that the baby carriage has a construction which enables it to stand by itself when folded. Further, the folding operation of such a conventional type of baby carriage is not necessarily simple. Accordingly, there is a desire for a baby carriage which is simple to fold, for example, to the extent that it can be folded by one hand.

Further referring to the configuration of the baby carriage it's in folded condition described above, the baby carriage is often pulled along by the user holding it by one hand with some of the wheels contacted with the ground, as a means of conveyance. In this case, it is desired that the height of the baby carriage in the folded condition be sufficiently little. And it is required that the baby carriage be sufficiently lightweight not to become a burden.

Baby carriages meeting these requirements are disclosed in U.S. Pat. No. 4,317,581 and U.S. Pat. No. 4,386,790; filed by the same applicant as in the present patent application. This application, however, is intended to provide a further improved modification.

SUMMARY OF THE INVENTION

Accordingly, a principal object of the invention is to provide a modified folding mechanism for baby carriages, while satisfying the desires described above.

In brief, this invention provides a baby carriage comprising a pair of forwardly downwardly extending front legs, a pair of rearwardly downwardly extending rear legs pivotally connected at their upper ends to said front legs, a pair of support angle bars pivotally connected at their one end to the middle regions of said rear legs, a pair of pusher rods pivotally connected at their lower ends to the other ends of said support angle bars, a slidable and pivotal connecting member for slidably and pivotally connecting the upper end of each said front leg to the associated pusher rod, and a pair of transverse connecting rods for operatively connecting said front legs and said support angle rods together, one of said front legs, one of said rear legs, one of said pusher rods and one of said transverse connecting rods in the respective pairs constituting one lateral surface forming structure, the other front leg, rear leg, pusher rod and transverse connecting rod constituting the other lateral surface forming structure with connecting rods horizontally extending between said one lateral surface forming structure and said other lateral surface forming structure to connect them together.

According to this invention, a relatively simple folding mechanism is achieved and hence a baby carriage can be obtained for which the folding operation is simple. Further, in opened condition, the pusher rods are lifted to a sufficient height in that the support angle bars assume an upwardly directed position with respect to the rear legs, while in closed condition, the pusher rods are brought to a low position in that the support angle bars are brought to a downwardly directed position. As a result, the pusher rods, in opened condition, secure the necessary height and, in their closed condition, are brought to a lower position, so that the bulkiness in the direction of height in their closed condition is reduced. Further, since the members are brought into a substantially parallel and adjacent condition in closed condition, the bulkiness in the transverse direction is also sufficiently reduced. Therefore, in cases where the baby carriage is held on the user's arm as a means of conveyance, the conveyance is easy. Also in such closed condition, the front and rear wheels are on a level with each other, enabling the baby carriage to stand by itself. Further, since the front and rear wheels are folded in the same direction, the rolling of the wheels can be utilized for conveyance while pulling along. Further, the closing or opening operation can be effected in a single action by one hand.

These and other objects and features of the invention will become more apparent from the following detailed description when taken in conjunction with the accompanying drawings.

DETAILED DESCRIPTION OF THE PREFERRED EMBODIMENTS

Figure 1:
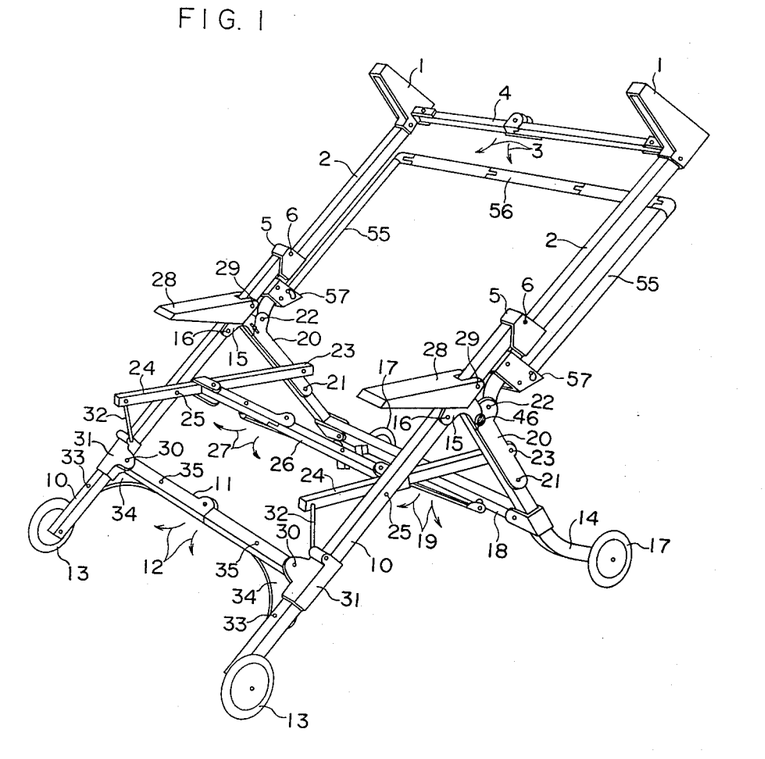
FIG. 1 is a perspective view of a baby carriage in its opened state according to an embodiment of the invention.
Figure 2:
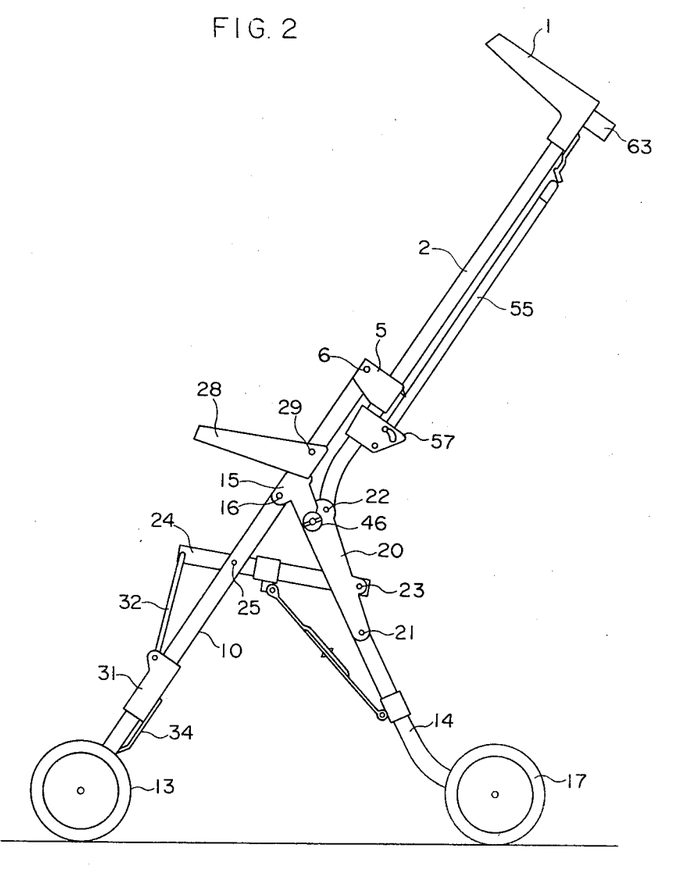
FIG. 2 is a right-hand side view of the baby carriage of FIG. 1 in its opened state.
Figures 3, 15:
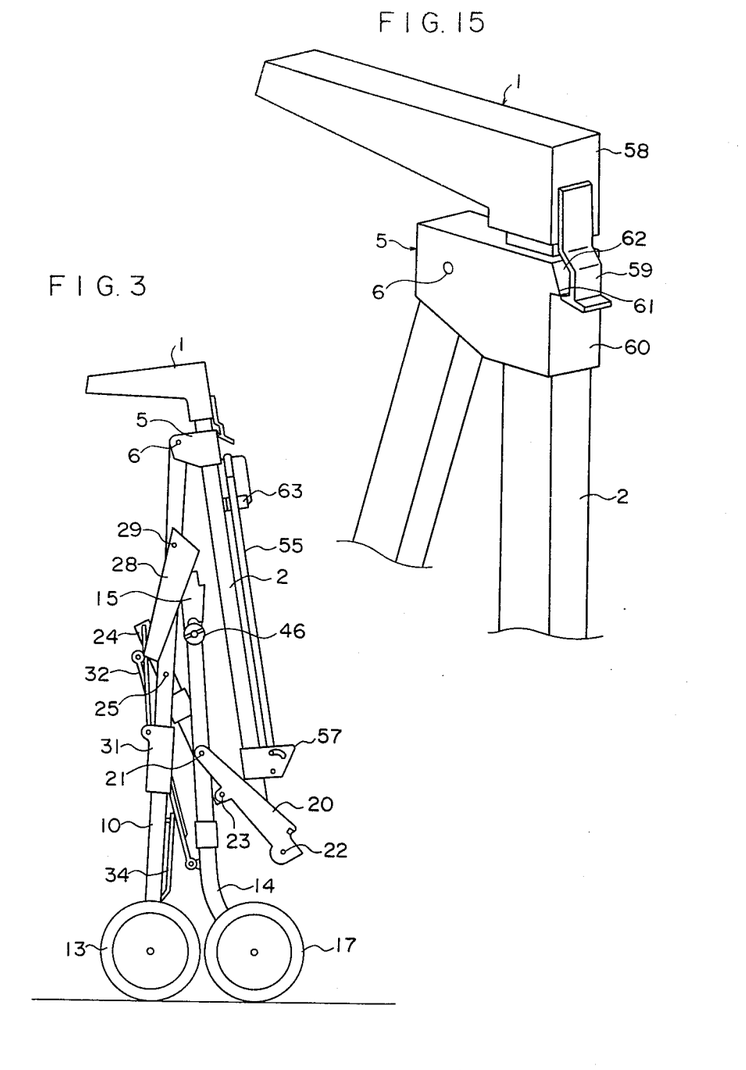
FIG. 3 is a right-hand side view of the baby carriage of FIG. 1 in its closed state.
FIG. 15 shows the upper end of a pusher rod 2, illustrating the baby carriage being locked in its closed state.

FIG. 1 is a perspective view of a baby carriage in its opened state according to an embodiment of the invention. FIG. 2 is right-hand side view of the baby carriage in its closed state. FIG. 3 is right-hand side view of the baby carriage in its closed state.

With reference principally to the figures showing the opened state, the overall construction of the illustrated baby carriage will be described.

Grips 1 for use by the operator in conveying the baby carriage are installed on the upper ends of a pair of pusher rods 2. The upper ends of the pusher rods 2 are connected by a pusher rod connecting rod 4 foldably in the direction of arrows 3. The pusher rods 2 are curved in their lower ends, and their straight portions serve as guides for slidable and pivotal connecting members 5. The upper ends of front legs 10 are pivotally connected to the slidable and pivotal connecting members 5 through pivot pins 6. The right and left front legs 10 are connected together by a front leg connecting rod 11 for reinforcement purposes. The front leg connecting rod 11 is foldable in the direction of arrows 12. The front leg connecting rod 11 may be utilized for installation of a footrest (not shown) for supporting the feet of a baby placed in the baby carriage. Rotatably front wheels 13 are installed at the lower ends of the front legs 10. Rear legs 14 are connected to the lengthwise intermediate regions of the front legs 10. More particularly, a connecting plate 15 is fixedly attached to the upper end of each rear leg 14, and a pin 16 extending through the end of the connecting plate 15, whereby the rear leg 14 is pivotally connected to the associated front leg 10. A rear wheel 17 is pivotally installed on the lower end of each rear leg 14. The right and left rear legs 17 are connected together by a rear leg connecting rod 18 for reinforcement purposes. The rear leg connecting rod 18 is foldably in the direction of arrows 19. One end of a support angle bar 20 is pivotally connected to the lengthwise intermediate region of each rear leg 14 through a pivot pin 21, pivotally connected to the other end of the support angle bar 20 through a pivot pin 22 is the lower end of the associated pusher 4 or 2. A transverse connecting rod 24 is pivotally connected to the middle region of the support angle bar 20 through a pivot pin 23. The transverse connecting rod 24 transversely extends and where it crosses the associated front leg 10, it is pivotally connected to the latter by a pivot pin 25. The transverse connecting rod 24 has a portion forwardly extending beyond the front leg 10. The right and left transverse connecting rods 24 are connected together by a middle connecting rod 26. The middle connecting rod 26 is foldable in the direction of arrows 27. Handrails 28 are installed forwardly extending beyond the front legs 10. The handrails 28 are pivotally connected to the front legs 10 by pivot pins 29.

The various parts will now be described in more detail.

The opposite ends of the front leg connecting rod 11 are pivotally connected to sliders 31 through pivot pins 30. The sliders 31 are slidably mounted on the front legs 10. A bar link 32 is connected between the slider 31 and the transverse connecting rod 24. An arm 34 is pivotally connected to each front leg 10 through a pivot pin 33. By means of a pivot pin 35 located at the front end of the arm 34 and spaced a predetermined distance apart from each end of the front leg connecting rod 11, the arm 34 and the front leg connecting rod 11 are pivotally connected together.

In such arrangement, if the front ends of the transverse connecting rods 24 are upwardly turned, the sliders 31 are slid upwardly along the front legs 10 by the bar links 32. In response thereto, the opposite ends of the front leg connecting rod 11 are pulled up. As a result, the front leg connecting rod 11 held by the arms 34 through the pivot pins 35 tend to fold in the direction of arrow 12. Thereby, the pair of front legs 10 are allowed to move toward each other. In addition, the reverse operation can also be likewise performed through the bar links 32 and sliders 31.

Figure 4:
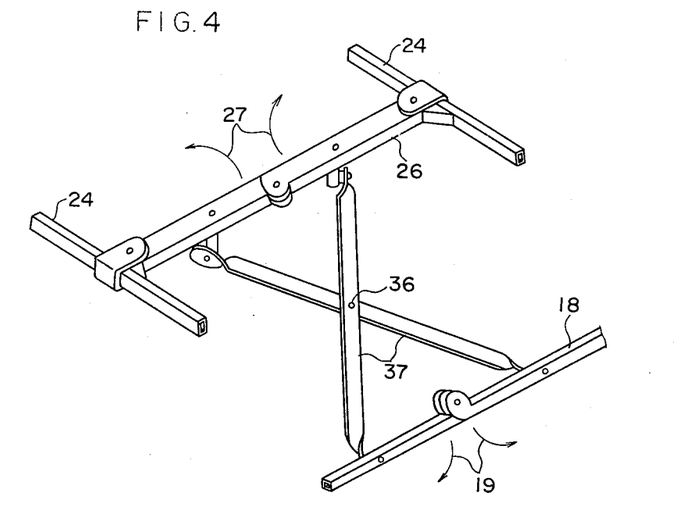
FIG. 4 is a perspective view showing a connecting mechanism between a central connecting rod 26 and a rear leg connecting rod 18 in the baby carriage of FIG. 1.

FIG. 4 is a perspective view showing a connecting mechanism between the central connecting rod 26 and the rear leg connecting leg 18.

A pair of interlocking links 37 crossing each other in X-shape and pivotally connected together by a pivot pin 36 are pivotally connected between the central connecting rod 26 and the rear leg connecting rod 18. It is preferable that the interlocking links 37 and the central connecting rod 26 and rear leg connecting rod 18 be connected together in a universal joint fashion.

In the closing operation of the baby carriage, as will become apparent from a description to be given later, the central connecting rod 26 and the rear leg connecting rod 18 move toward each other. Since this results in the interlocking links 37 propping or thrusting themselves against them, the following of the central connecting rod 26 in the direction of arrows 27 and the folding of the rear leg connection rod 18 in the direction of arrows 19 are operatively associated with each other. Reversely, in the opening operation of the baby carriage, the central connecting rod 26 and the rear leg connecting rod 18 are moved away from each other. Since this result in the interlocking links 37 drawing the central connecting rod 26 and rear leg connecting rod 18 toward each other, the central connecting rod 26 and rear leg connecting rod 18 are straightened.

Figure 5:
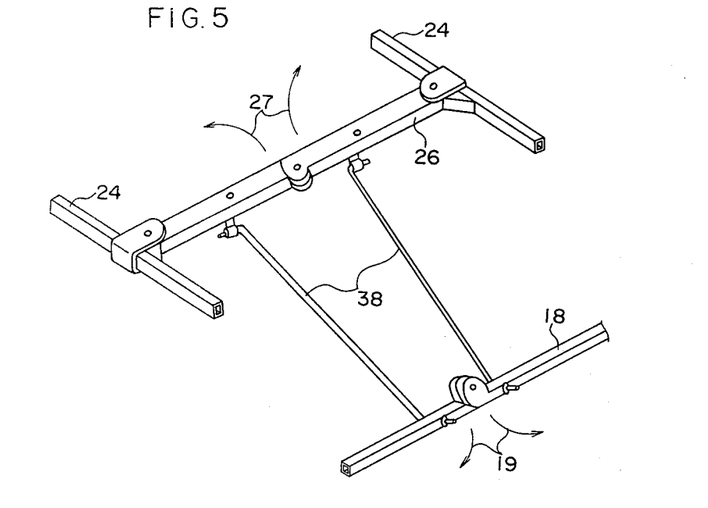
FIGS. 5 and 5A are perspective views, respectively showing a modification of the connecting mechanism of FIG. 4.

FIG. 5 is a perspective view showing a modification of the connecting mechanism in FIG. 4. In this example, the interlocking links 37 crossing in X-shape are replaced by a pair of interlocking links 38 extending parallel or in V-shape. It is preferable that the interlocking links 38 and the central connecting rod 26 and rear leg connecting rod 18 be connected together in a universal joint fashion. The interlocking links 38 described here perform the same function as that of the interlocking links 37 in FIG. 4, and since the description given with reference to FIG. 4 is applicable thereto, a further description of the interlocking links 38 is omitted.

Figure 5A:
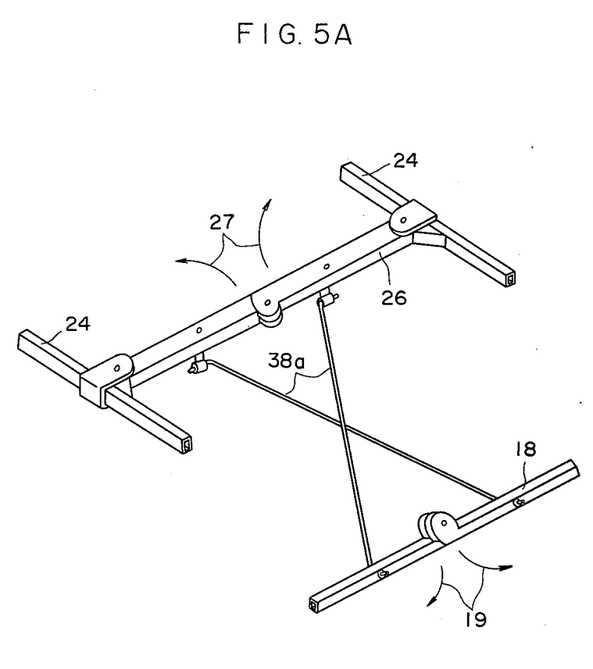

FIG. 5A is a perspective view of a further modification of the connecting mechanisms shown in FIGS. 4 and 5. In a sense, the modification may be said to be a combination of the features of the interlocking mechanisms shown in FIGS. 4 and 5. Thus, interlocking links 38a used therein employ the same bar-like material as the interlocking links 38 shown in FIG. 5, and the connections between the central connecting rod 26 and the rear leg connecting rod 18 are of the same construction as in FIG. 5. However, the pair of interlocking links 38a cross each other in X-shape as in the case of the interlocking links 37 shown in FIG. 4. In addition, they are not pivotally connected together by a pivot pin 37, as in the interlocking links 37 shown in FIG. 4, and instead the interlocking links 38a are free relative to each other. The interlocking links 38a perform the same function as that of the interlocking links 37 and 38 described above.

Figures 6, 7, 8, 9:
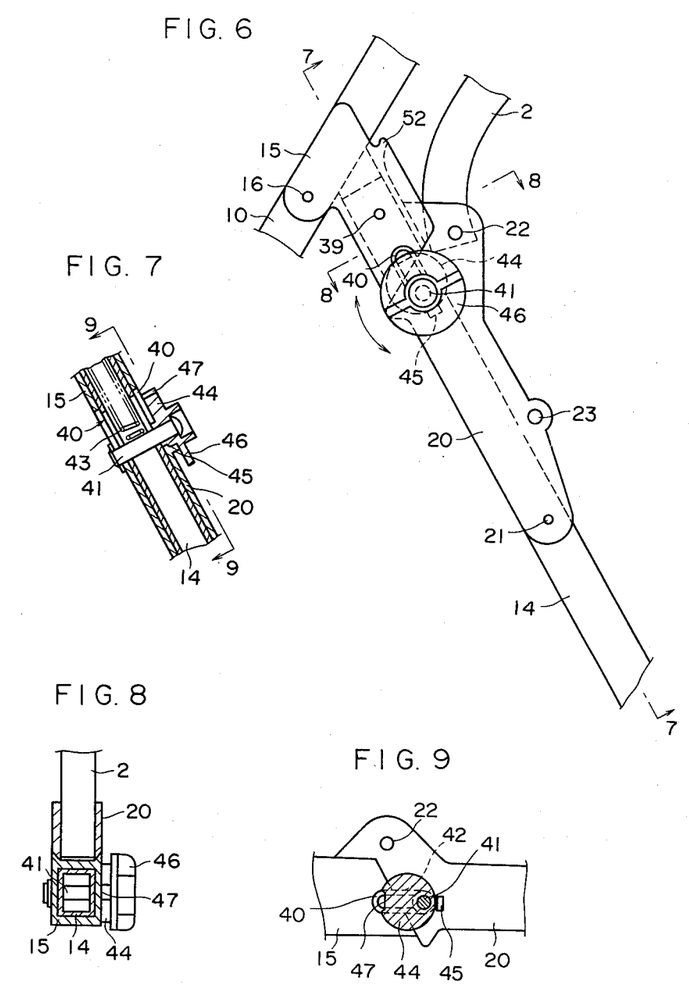
FIG. 6 is a side view showing a locking mechanism for locking the opened state of the baby carriage of FIG. 1 and also showing a support angle bar 20 and related arrangements.
FIG. 7 is a sectional view taken along the line 7—7 in FIG. 6.
FIG. 8 is a sectional view taken along the line 8—8 in FIG. 6.
FIG. 9 is a sectional view taken along the line 9—9 in FIG. 7.

FIG. 6 is a side view showing a locking mechanism for locking the opened state of the baby carriage, and also showing the support angle 20 and related arrangements. FIG. 7 is a sectional view taken along the line 7—7 in FIG. 6. FIG. 8 is a sectional view taken along the line 8—8 in FIG. 6. FIG. 9 is a sectional view taken along the line 9—9 in FIG. 7.

The connecting plate 15 receives the upper end of the rear leg 14 and is fixed thereto by a fixing pin 39. Elongated guide openings 40 extending lengthwise of the rear leg 14 are formed in the latter adjacent the upper end thereof. A locking pin 41 is inserted in the elongated guide openings 40. The locking pin 41 is movable in the elongated guide openings 40. The support angle bar 20 shown in FIG. 6 is formed adjacent the upper end thereof with a notch 42 (best shown in FIG. 12) adapted to overlap the elongated guide openings 40 to coincide with part of the elongated guide openings 40. The locking pin 41, as shown in FIG. 7, is urged by a compression spring 43 into the notch 42. An eccentric cam 44 in contact with the lateral surface of the support angle bar 20 is provided around the locking pin 41. The lateral surface of the support angle bar 20 is provided with a projection 45 as an active portion for contact with the eccentric cam 44. An operating knob 46 is provided in fixed relation to the eccentric cam 44.

The state shown in FIGS. 6 through 9 is a locked state. That is, the locking pin 41 fits in the notch 42, with the support angle bar 20 maintained in alignment with the rear leg 14 and being unable to turn relative to the rear leg 14. This state is established when the short radius portion of the eccentric cam 44 comes in contact with the projection 45, and in this state the compression spring 43 forces the locking pin 41 into the notch 42, thus maintaining the locked state.

Figures 10, 11, 12:
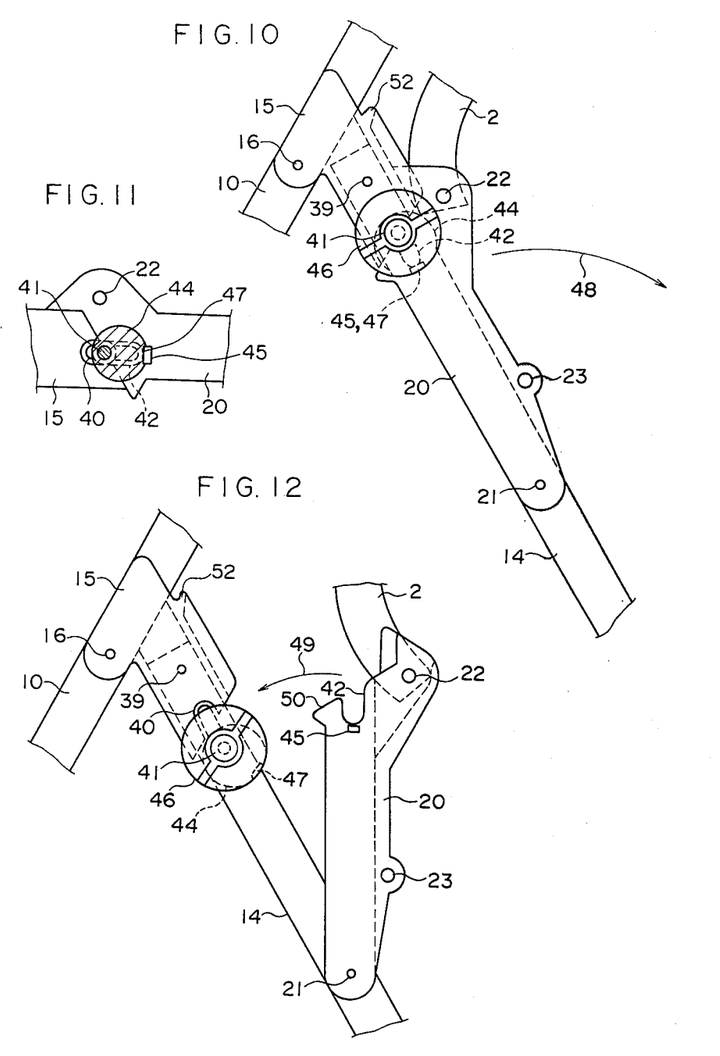
FIG. 10 shows parts corresponding to those shown in FIG. 6, illustrating a condition assumed immediately after unlocking.
FIG. 11 shows parts corresponding to those shown in FIG. 9, illustrating a condition corresponding to that of FIG. 10.
FIG. 12 shows parts corresponding to those shown in FIG. 6, illustrating a condition intermediate between the opening and closing of the baby carriage.

The unlocking operation will now be described. FIG. 10 shows parts corresponding to those shown in FIG. 6, illustrating the state assumed immediately after unlocking. FIG. 11 shows parts corresponding to those shown in FIG. 9, illustrating a state corresponding to that shown in FIG. 10. Unlocking can be effected by turning the eccentric cam 44 through 180 degrees in either direction through the intermediary of the operating knob 46. In response thereto, the state shown in FIGS. 10 and 11 is established. Thereupon, the long radius portion of the eccentric cam 44 comes in contact with the projection 45. Thereby, the locking pin 41 is moved in a direction in which it comes out of the notch 42 against the resilience of the compression spring 43. In addition, in order to eliminate the unstability which causes the eccentric cam 44, which is depressed by the compression spring 43 through the locking pin 41, to reversely turn with the projection 45 as a fulcrum, the long radius portion of the eccentric cam 44 may be formed with a recess 47 (best shown in FIGS. 9 and 11) for receiving the projection 45.

A description will now be given of an operation directly connected with the support angle bars 20 in the operation which ranges from the completion of unlocking to the closing of the baby carriage. FIG. 12 shows parts corresponding to those shown in FIG. 6, illustrating a state intermediate between the opening and closing of the baby carriage. In FIG. 10 described above, since the locking pin 41 has come out of the notch 42, the support angle bar 20 is allowed to turn around the axis of the pivot pin 21 in the direction of arrow 48. In response to the turning movement of the support angle bar 20 in the direction of arrow 48, the projection 45, which has been in contact with the long radius portion of the eccentric cam 44, moves in a direction in which it leaves the eccentric cam. When the projection 45 has completely separated from the eccentric cam 44, as shown, e.g., in FIG. 12, the locking pin 41 moves to the lower ends of the elongated guide openings 40 under the action of the compression spring 43.

When the baby carriage is brought to its opened state from its closed state, the support angle bar 20 turns around the axis of the pivot pin 21 in the direction of arrow 49, with the projection 45 approaching the eccentric cam 44. At this instant, with the turning movement of the support angle bar 20 in the direction of arrow 49, a guide portion 50 formed on one side of the notch 42 in the support angle bar 20 may force the locking pin 41 more or less upwardly. And at substantially the same time as this action, the projection 45 comes in contact with the eccentric cam 44. The turning movement of the support angle bar 20 in the direction of arrow 49 with the projection 45 kept in contact with the eccentric cam 44 tends to force the eccentric cam 44 to turn until it assumes the attitude shown in FIG. 6. This is because the locking pin 41, which serves as an eccentric shaft for the eccentric cam 44 and which has been strongly depressed by the compression spring 43, tends to remain at the lower ends of the elongated guide openings 40 and, on the other hand, the projection 45 tends to approach the locking pin 41 owing to the turning movement of the support angle bar 20 in the direction of arrow 49 and because if the relative positional relation between the two is to be satisfied, the eccentric cam 44 must turn so that the short radius portion contacts the projection 45. Therefore, when the support angle bar 20 has been aligned with the rear leg 14, the state shown in FIG. 6 is automatically established and so is the locked state.

Figure 13:
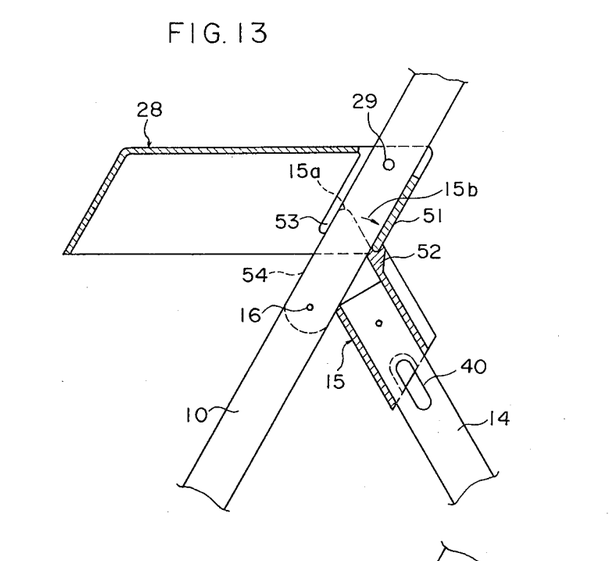
FIG. 13 is a side view showing how a handrail 28 in FIG. 1 is attached to a front leg.
Figure 14:
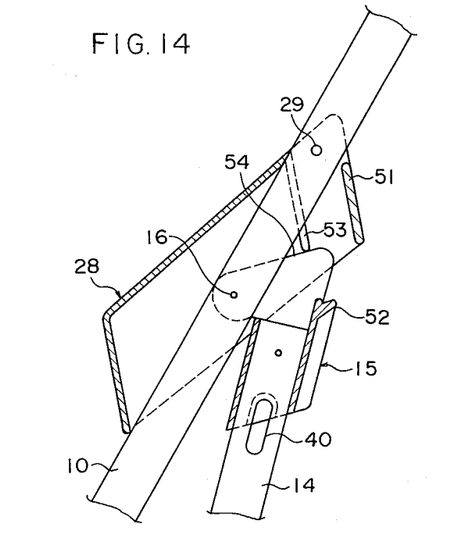
FIG. 14 is a side view showing the attitude of the handrail 28 in the closed state of the baby carriage.

FIG. 13 is a side view showing how the handrail 28 is attached to the front leg 10. FIG. 14 is a side view showing the attitude of the handrail 28 in the closed state of the baby carriage.

Referring to FIG. 13, the handrail 28 is pivotally connected to the front leg 10 by the pivot pin 29.

The horizontal attitude of the handrail 28 shown in FIG. 13 is maintained by an arrangement described below. The rearmost portion of the handrail 28 is formed with an engaging wall 51. On the other hand, the connecting plate 15 for the rear leg 14 is formed with an engaging projection 52 adapted to engage the lower end of the engaging wall 51. Therefore, in the state of the rear leg 14 being opened with respect to the front leg 10, i.e., in the opened state of the baby carriage, the engaging projection 52 engages the lower end of the engaging wall 51, preventing the handrail 28 from turning downwardly round the axis of the pivot pin 29. In this manner, the handrail 28 can be maintained horizontal in the opened state of the baby carriage.

When the baby carriage is brought to its closed state, the rear leg 14 is turned around the axis of the pivot pin 16, approaching the front leg 10, as shown in FIG. 14. In response thereto, the engaging projection 52 separates from the engaging wall 51. Therefore, the handrail 28 is allowed to turn downwardly around the axis of the pivot pin 29. Further, a terminal lateral wall surface 15a formed on the connecting plate 15 moves in the direction of arrow 15b to contact the engaging wall 51 in the early stage of the turning movement of the rear leg 14, thereby forcing the handrail 28 to turn downwardly. And at least at the end of the downward turning movement of the handrail 28, the handrail overlaps the front leg under the force of gravity.

When the baby carriage is brought to its opened state from its closed state, it automatically changes from the FIG. 14 state to the FIG. 13 state. The handrail 28 is formed with a follower 53 constituting part of a cam device. And the connecting plate 15 is formed with a cam surface 54 paired with the follower 53. Therefore, when the rear leg 14 is turned around the axis of the pivot pin 16 to open relative to the front leg 10, the cam surface 54 pushes up the follower 53 while contacting the latter. In response thereto, the handrail 28 is turned upwardly around the axis of the pivot pin 29. When the final position of the turning movement of the handrail 28 is approached, the engaging projection 52 engages the engaging wall 51, whereby the attitude of the handrail 28 shown in FIG. 13 is re-established. At this instant, the cam surface 53 remains in contact with the follower 53, so that the horizontal attitude of the handrail 28 is firmly held.

Referring back to FIGS. 1 through 3, there are shown backrest retaining frames 55 for retaining the backrest of a hammock (not shown) on which to place a baby. The upper ends of the pair of backrest retaining frames 55 are connected together by a foldable backrest connecting rod 56. The transverse connecting rods 24 and central connection rod 26 are utilized to attach the seat of the hammock thereto. The lower ends of the backrest retaining frames 55 are connected to reclining adjusting members 57, whereby the reclined state can be adjusted.

FIG. 15 shows the upper end of the pusher rod 2, illustrating the baby carriage locked in its opened state.

When the baby carriage has assumed its closed state, the slidable and pivotal connecting member 5 slides on the pusher rod 2 until it reaches its upper end. If, therefore, the slidable and pivotal connecting members 5 are locked in this position, the baby carriage is locked in its closed state. For this locking, the rear wall 53 of the grip 1 has an engaging piece 59 attached thereto. The engaging piece 59 is formed of a suitable springy material. The rear wall 60 of the slidable and pivotal connecting member 5 is formed with an engaging projection 61. The portion extending upwardly from this engaging projection 61 forms a suitable slope 62. Thus, when the slidable and pivotal connecting member 5 slides upwardly on the pusher rod 2, the engaging piece 59 is guided by the slope 62. Upon passing over the slope 62, the engaging piece 59 automatically engages the engaging projection 61. The unlocking can be effected by forcibly deforming the engaging piece 59 rearward.

The opening and closing operations of the baby carriage will now be described. In the opened state of the baby carriage, the support angle bars 20 are aligned with the rear legs 14 and locked by the locking mechanism including the locking pins 41.

For a change from the opened state described above to the closed state, the operating knobs 46 are turned through 180 degrees for unlocking, as described with reference to FIGS. 6 through 11. Subsequently, the baby carriage is lifted above the ground by the hands holding the grips 16, whereupon the support angle bars 20 turn in the direction of arrow 48 (FIG. 10). Next, with the rear wheels 17 held in contact with the ground, the baby carriage is rearwardly tilted to lift the front wheels 13 and the grips 1 are then depressed. If the forces for depressing the grips 1 are exerted through the intermediary of an operating portion 63 provided at the center of the pusher rod connecting rod 4, the folding of the pusher rod connecting rod 4 in the direction of arrows 3 will take place advantageously. While such operation is proceeding, the pusher rods are brought to their lower position and the slidable and pivotal connecting member 5 slide upwardly on the pusher rods 2. In response thereto, the transverse connecting rods 24 are turned such that their front ends are upwardly directed, and the sliders 31 slide upwardly on the front legs 101. In response thereto, the front leg connecting rod 11 is folded in the direction of arrows 12. This folding of the front leg connecting rod 11 results in the pair of front legs 10 moving toward each other. Further, concurrently therewith, there take place the movement of the pair of rear legs 14 toward each other and the movement of the rear legs 14 toward the front legs 10. As a result, the rear leg connecting rod 18 and the central connecting rod 26 move toward each other and are folded in the directions of arrows 19 and 27, respectively. Since the engagement between the engaging wall 51 and the engaging projection 52 is cancelled, each handrail 28 falls down to extend along the associated front leg 10. Finally, as shown in FIG. 3, the front legs 10 stand substantially parallel with the pusher rods 2 and the rear legs 14 also stand substantially parallel with the pusher rods 2. And the right and left members move toward each other. In this manner, the closed state is obtained, which is locked by the locking mechanism shown in FIG. 15. In the FIG. 3 state, the two front wheels 13 and the two rear wheels 17 are substantially on the same level, the baby carriage is capable of standing by itself in its closed state.

For a change from the closed state to the opened state, first the engagement of the engaging pieces 59 with the engaging projections 61 is cancelled. Next, the entire baby carriage is lifted in the air by holding the operating portion 63. In response thereto, the weight of the baby carriage works, turning the support angle bars 20 around the axis of the pivot pins 22 at the lower ends of the pusher rods 2. Concurrently therewith, the front leg connecting rod 11 is straightened to separate the front legs 10 from each other. Substantially at the same time, the rear legs 14 are turned away from the front legs 10. In response thereto, the rear leg connecting rod 18 and central connecting rods 26 are straightened in interlocking relation by the action of the connecting links 37 (or 38). In such operation, the pair of pusher rods 2, the pair of rear legs 14 and the pair of transverse connecting rods 24 move to expand widthwise. And the operation from FIGS. 12 through 16 proceeds and the locked state is established. Further, the handrails 28 are brought into the horizontal state, which is maintained by the engaging projection 52. In this manner, the baby carriage is opened and automatically locked in its opened state.

Figure 15A:
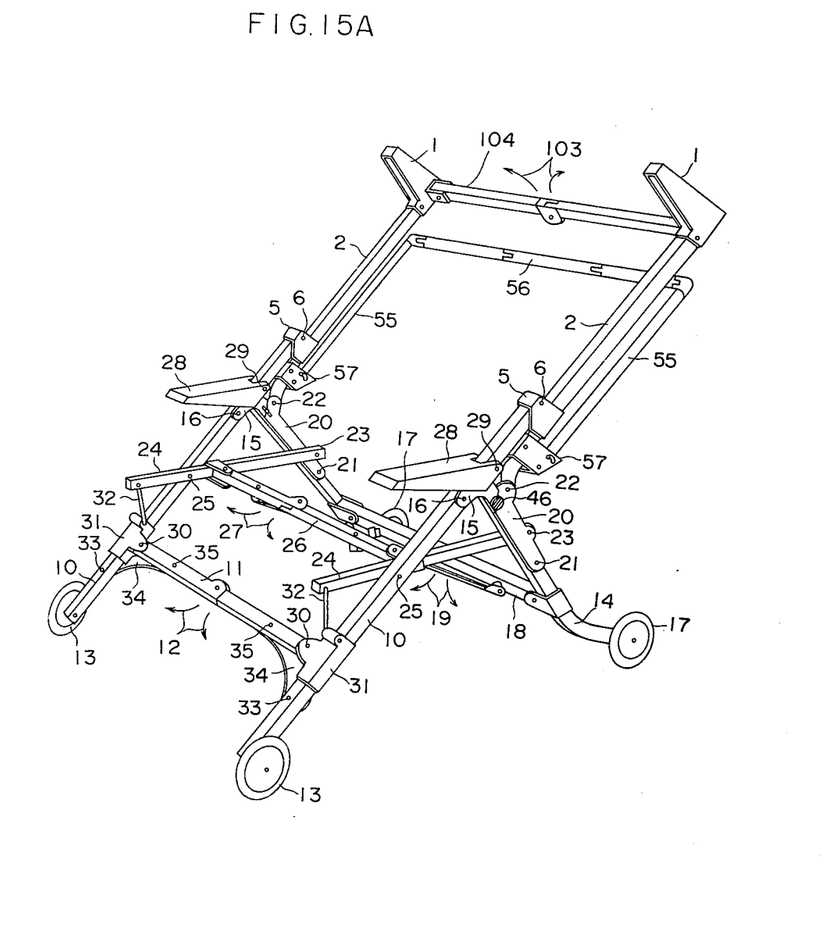
FIG. 15A is a perspective view of a baby carriage in its opened state according to another embodiment of the invention.

FIG. 15A is a perspective view of a baby carriage in its opened state according to another embodiment of the invention.

The baby carriage shown therein differs in the folding direction of the pusher rod connecting rod from the baby carriage of FIG. 1. That is, the pusher rod connecting rod 104 is relatively forwardly folded, as indicated by arrows 103. The other arrangements and the folding operation are the same as in the baby carriage shown in FIG. 1.

As can be seen from this embodiment, the folding direction of the pusher rod connecting rod may be optionally selected.

Figure 16:
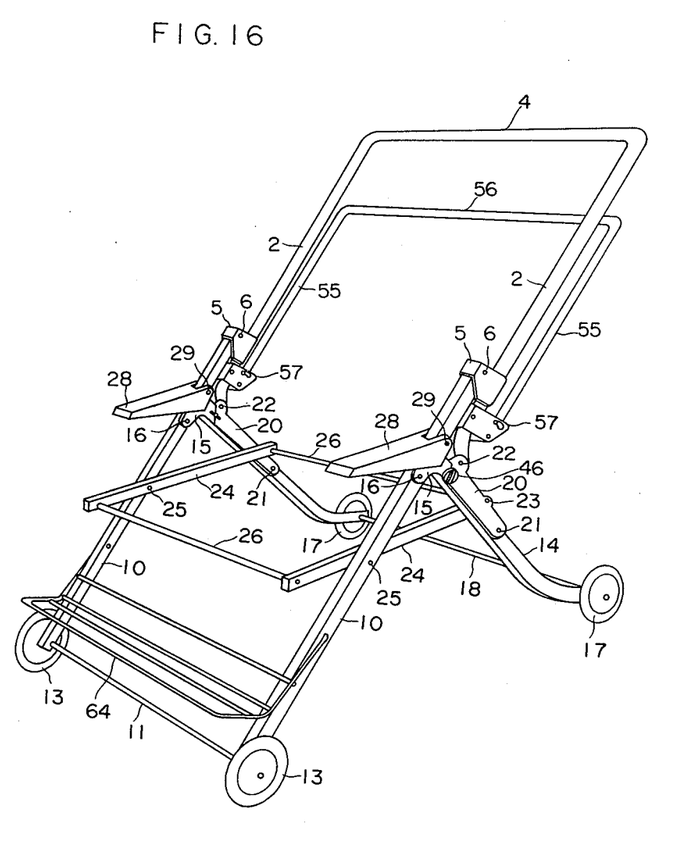
FIG. 16 is a perspective view of a baby carriage in its opened state according to further embodiment of the invention.
Figure 17:
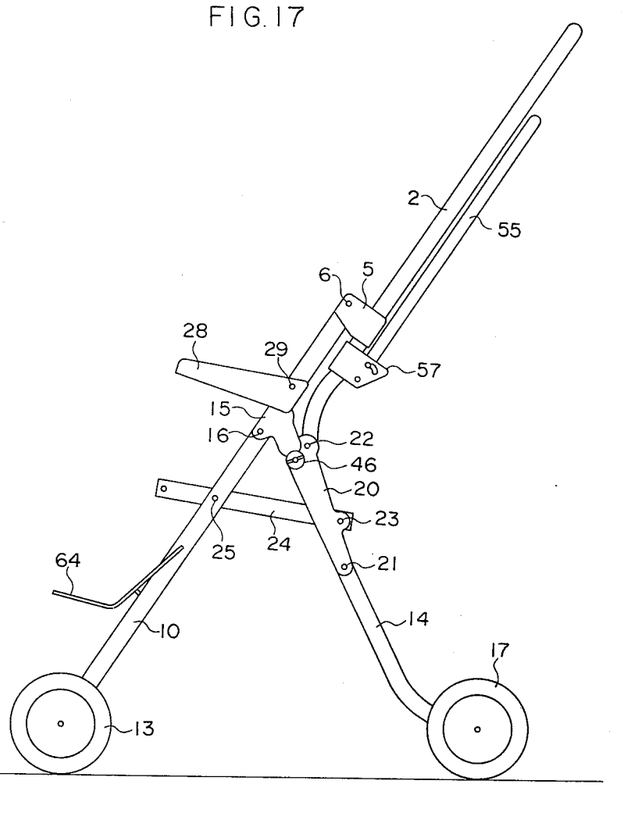
FIG. 17 is a right-hand side view of the baby carriage of FIG. 16 in its opened state.
Figure 18:
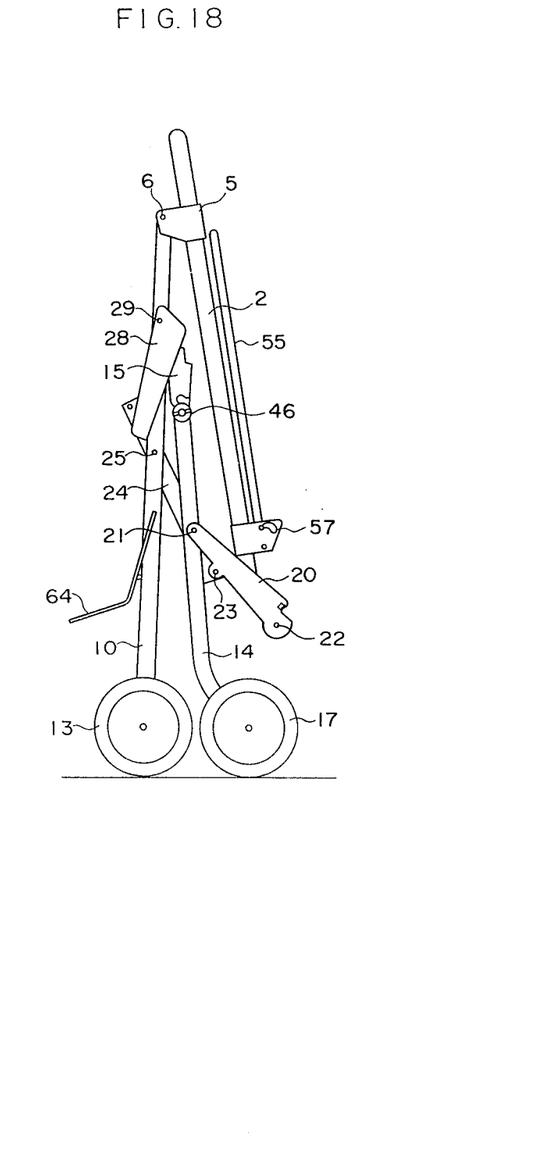
FIG. 18 is a right-hand side view of the baby carriage of FIG. 16 in its closed state.

FIG. 16 is a perspective view of a baby carriage in its opened state according to a further embodiment of the invention. FIG. 17 is a right-hand side view of the baby carriage in the opened state. FIG. 18 is a right-hand side view of the baby carriage in the closed state.

The great difference between the baby carriage shown therein and each of the baby carriages described above is that this baby carriage is not designed for widthwise contraction. Therefore, the arrangement of the baby carriage is the simpler. The arrangement and functions of this baby carriage will be made clear by describing only those parts which differ.

First, the pusher rods 2 and pusher rod connecting rod 4 are constituted of an integral material. In connection therewith, the backrest retaining rods 55 and connecting rod 56 are also constituted of an integral material. The front leg connecting rod 11 is constituted of an integral rod. Likewise, the rear leg connecting rod 18 is constituted of an integral rod. Therefore, the sliders 31, bar links 32, and arms 34, etc., are not furnished. The central connecting rods 26 are arranged at the front and back of the transverse connecting rods 24 and are each constituted of an integral rod. Further, a footrest 64 is attached to the lower ends of the front legs 10.

The opening and closing operations of the baby carriage shown in FIGS. 16 through 18 are substantially the same as in the above-described baby carriages except that expansion and contraction does not take place in the direction of the width.

That is, the mutual movements of the pusher rods 2, front legs 10, support angle bars 20 and transverse connecting rods 24 proceed substantially in the same manner as in the baby carriages described previously.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A baby carriage comprising:
a pair of forwardly and downwardly extending front legs (10) each in the form of a single, substantially straight bar,
a pair of rearwardly and downwardly extending rear legs (14) pivotally connected at their upper ends (15) to said front legs (10),
a pair of support angle bars (20) pivotally connected at their lower ends (21) to the middle regions of said rear legs (14),
a pair of pusher rods (2) pivotally connected at their lower ends to the upper ends (22) of said support angle bars (20),
a slidable and pivotal connecting member (5) for slidably and pivotally connecting the upper end of each said front leg (10) to the associated pusher rod (2), and
a pair of transverse connecting rods (24) for operatively connecting said front legs (10) and said support angle bars (20) together,
one of said front legs (10), one of said rear legs (14), one of said pusher rods (2) and one of said transverse connecting rods (24) constituting one lateral surface forming structure, the other front leg (10), rear leg (14), pusher rod (2) and transverse connecting rod (24) constituting the other lateral surface forming structure, with connecting rods (4, 11, 18, 26) horizontally extending between said one lateral surface forming structure and said other lateral surface forming structure.

2. A baby carriage as set forth in claim 1, wherein said connecting rods (4, 11, 18, 26) are foldable.

3. A baby carriage as set forth in claim 1, wherein said connecting rods (4, 11, 18, 26) are not foldable.

4. A baby carriage as set forth in claim 1, wherein said baby carriage is adapted to be opened when said support angle bars (20) and said rear legs (14) are aligned with each other, and further includes a locking mechanism (40, 41, 42) for locking said aligned state of said support angle bars (20) and said rear legs (14) so as to lock the opened state of the baby carriage.

5. A baby carriage as set forth in claim 4, wherein the portions of said rear legs (14) adjacent their upper ends are each formed with an elongated guide opening (40) extending lengthwise of the rear leg,
said elongated guide opening having a locking pin (41) movably inserted therein,
the portion of each said support angle bar (20) adjacent the other end thereof being formed with a notch (42) adapted to overlap said elongated guide opening (40) to coincide with part of the latter,
said locking pin (41) being urged by a spring (43) into said notch (42),
an eccentric cam (44) contacted with the lateral surface of said support angle bar (20) being installed around said locking pin (41),
the lateral surface of said support angle bar (20) being provided with an active portion (45) for contact with said eccentric cam (44),
the arrangement being such that when said active portion (45) and the short radius portion of said eccentric cam (44) come in contact with each other, said locking pin (41) enters said notch (42) to maintain the state of alignment between said support angle bar (20) and said rear leg (14) so as to lock the baby carriage in its opened state, while when the active portion (45) and the long radius portion of the eccentric cam (44) come in contact with each other, said locking pin (41) comes out of said notch (42) to render said support angle bar (20) turnable relative to said rear leg (14), thereby allowing the baby carriage to close.

6. A baby carriage as set forth in claim 5, wherein an operating knob (46) is provided in fixed relation to said eccentric cam (44).

7. A baby carriage as set forth in claim 5 or 6, wherein the long radius portion of said eccentric cam (44) is formed with a recess (47) for receiving said active portion (45).

8. A baby carriage as set forth in claim 1, further including handrails (28) pivotally connected to said front legs at their rear portions (29) above the connections between said front legs (10) and said rear legs (14),
the rear end of each said handrail (28) being formed with an engaging wall (51), at the lower end of which an engaging projection (52) to be engaged thereby from behind in the opened state of the baby carriage is provided in fixed relation to said rear leg (14), whereby in said opened state the horizontal state of said handrails (28) is maintained, while in the closed state of the baby carriage, with the turning movement of said rear legs (14), said engaging projection (52) separates from said engaging wall (51) and said handrails (28) are folded to overlie said front legs (10),
a cam surface (54) provided in fixed relation to said rear leg (14), and each said handrail (28) being formed with a follower (53) to be paired with said cam surface (54), whereby during a change from the closed state to the opened state and in accordance with the turning movement of said rear legs (14), said cam surfaces (54) turn said handrails (28) upwardly while contacting said followers (53), and when said handrails (28) approach the final position of the upward turning movement, said projections (52) engage said engaging walls (51) to maintain the horizontal attitude of the hand rails (28).

9. A baby carriage as set forth in claim 2, wherein said connecting rods include a front leg connecting rod (11) extending between said pair of front legs (10), and further including
a pair of sliders (31) fitted on the middle regions of said pair of front legs (10) so that they are slidable lengthwise of the front legs (10),
a pair of bar links (32) connected between said pair of sliders (31) and the front ends of said pair of transverse connecting rods (24),
a pair of arms (34) inwardly extending from said pair of front legs (10) and pivotally connected thereto,
said front leg connecting rod (11) being foldable at the middle and being pivotally connected at its opposite ends to said sliders (31) (as at 30) and to said arms (34) at pivot points (35) each spaced a predetermined distance apart from the associated end of the front leg connecting rod.

10. A baby carriage as set forth in claim 2, wherein said connecting rods include:
a rear leg connecting rod (18) downwardly foldable at the middle and pivotally connected at its opposite ends to the lower portions of said pair of rear legs (14), and
a central connecting rod (26) forwardly foldable at the middle and pivotally connected at its opposite ends to the middle regions of said pair of transverse connecting rods (24), and said baby carriage further including
interlocking links (37, 38 or 38a) connected between said rear leg connecting rod (18) and said central connecting rod (26).

* * * * *